United States Patent [19]

Roskowski et al.

[11] Patent Number: 5,410,677
[45] Date of Patent: Apr. 25, 1995

[54] APPARATUS FOR TRANSLATING DATA FORMATS STARTING AT AN ARBITRARY BYTE POSITION

[75] Inventors: Steven G. Roskowski, Sunnyvale; Charles M. Flaig; Dean M. Drako, both of Cupertino, all of Calif.

[73] Assignee: Apple Computer, Inc., Cupertino, Calif.

[21] Appl. No.: 815,828

[22] Filed: Dec. 30, 1991

[51] Int. Cl.⁶ .................................................. G06F 7/06
[52] U.S. Cl. .............................. 395/500; 364/239.3; 364/244.5; 364/239; 364/DIG. 1
[58] Field of Search ......................... 395/325, 500, 600

[56] References Cited

U.S. PATENT DOCUMENTS

| | | |
|---|---|---|
| 3,109,162 | 10/1963 | Wolensky . |
| 4,276,611 | 6/1981 | Jansen et al. ..................... 364/900 |
| 4,402,040 | 8/1983 | Evett ............................... 364/200 |
| 4,413,258 | 11/1983 | Quick, Jr. et al. ............. 340/825.5 |
| 4,423,480 | 12/1983 | Bauer et al. ...................... 364/200 |
| 4,525,849 | 6/1985 | Wolf ................................ 375/118 |
| 4,606,002 | 8/1986 | Waisman ........................... 395/600 |
| 4,620,278 | 10/1986 | Ellsworth et al. ................ 364/200 |
| 4,621,342 | 11/1986 | Capizzi et al. .................... 364/900 |
| 4,683,534 | 7/1987 | Tietjen ............................. 395/325 |
| 4,766,536 | 8/1988 | Wilson, Jr. et al. .............. 364/200 |
| 4,766,538 | 8/1988 | Miyoshi ............................ 395/325 |
| 4,837,682 | 6/1989 | Culler .............................. 364/200 |
| 4,864,496 | 9/1989 | Triolo et al. ..................... 364/200 |
| 4,920,486 | 4/1990 | Nielsen ............................ 364/200 |
| 4,937,733 | 6/1990 | Gillett, Jr. et al. ............... 364/200 |
| 4,953,081 | 8/1990 | Feal et al. ........................ 364/200 |
| 4,956,771 | 9/1990 | Neustaedter ..................... 364/200 |
| 4,965,723 | 10/1990 | Kirk ................................ 395/325 |
| 5,097,437 | 3/1992 | Larson ............................. 395/775 |
| 5,111,424 | 5/1992 | Donaldson et al. ............... 395/725 |
| 5,113,369 | 5/1992 | Kinoshita ......................... 395/325 |
| 5,151,994 | 9/1992 | Wille et al. ...................... 395/800 |
| 5,155,484 | 10/1992 | Chambers ........................ 341/55 |
| 5,167,019 | 11/1992 | Fava et al. ....................... 395/200 |
| 5,179,557 | 1/1993 | Kudo ............................... 370/94.1 |
| 5,191,653 | 3/1993 | Banks et al. ..................... 395/275 |
| 5,193,149 | 3/1993 | Awiszio et al. .................. 395/200 |
| 5,193,197 | 3/1993 | Thacker ........................... 395/725 |
| 5,220,653 | 6/1993 | Miro ............................... 395/275 |
| 5,222,223 | 6/1993 | Webb, Jr. et al. ................ 395/425 |
| 5,265,215 | 11/1993 | Fukuda et al. .................... 395/325 |

FOREIGN PATENT DOCUMENTS

| | | |
|---|---|---|
| 0038189 | 10/1981 | European Pat. Off. ....... G06F 3/04 |
| 0127007 | 5/1984 | European Pat. Off. . |
| 0141724 | 5/1985 | European Pat. Off. . |
| 0240749 | 3/1987 | European Pat. Off. . |
| 2256563 | 12/1992 | United Kingdom ......... H04L 12/56 |

*Primary Examiner*—Eric Coleman
*Attorney, Agent, or Firm*—Blakely, Sokoloff, Taylor & Zafman

[57] ABSTRACT

A circuit for translating data in one of a plurality of data formats into data in any of the other of the plurality of the data formats including apparatus for storing data from a first number of input bytes of data, apparatus for selecting unused bytes from the first number of data bytes stored by the apparatus for storing data and from a second number of input bytes of data, apparatus for placing the unused bytes selected in numerical byte order, and apparatus for placing the data in the numerical byte order in byte position for transfer to the format of a destination device.

21 Claims, 7 Drawing Sheets

|  | MSB | | | | | | | LSB |
|---|---|---|---|---|---|---|---|---|
| BIT POSITION | 63 56 | 55 48 | 47 40 | 39 32 | 31 24 | 23 16 | 15 8 | 7 0 |
| BYTE LANE | 7 | 6 | 5 | 4 | 3 | 2 | 1 | 0 |
| DATA (64 Mxd) | 0 | 1 | 2 | 3 | 4 | 5 | 6 | 7 |
| (32 Sep) | | | | | 0 | 1 | 2 | 3 |
| (16 Sep) | | | | | | | 0 | 1 |
| (8 Sep) | | | | | | | | 0 |
| (32 Mxd) | 0 | 1 | 2 | 3 | | | | |
| ADDRESS | 0 | 1 | 2 | 3 | | | | |

APPARATUS FOR TRANSLATING DATA FORMATS STARTING AT AN ARBITRARY BYTE POSITION

BACKGROUND OF THE INVENTION

1. Field of the Invention

This invention relates to computer interface circuitry and, more particularly, to methods and apparatus for providing a single interface by which a computer may connect to any of a plurality of different peripheral devices which handle information in a plurality of different formats.

2. History of the Prior Art

Computers offer many possible formats in which data may be utilized. For example, some of the earlier personal computer processors were only capable of handling data presented to them in eight bit units. Later computer processors were capable of handling data in sixteen bit units. More recently designed computer processors are capable of handling data in thirty-two bit units, and the more advanced computers are capable of handling data furnished in sixty-four bit units. Often, these formats are a natural outgrowth of the particular information or the manner in which it is handled. For example, industry standards assure that information will be available in certain formats; IEEE standards for floating point numbers are thirty-two or sixty-four bits while ASCII characters are typically eight bits.

When a computer is connected to a peripheral device, the computer must be able to utilize the data provided by that device. This requires a computer which normally handles data in one particular format to communicate with peripheral devices which handle data in other formats. In general, a computer should be capable of communicating in all formats used in earlier models of the product line of the manufacturer. In this way, software and hardware designed for use with earlier models of the product line having lesser capabilities may be run by improved computers in the product line.

Normally, the ability to communicate with peripheral devices operating in other formats is provided by special circuit arrangements which are built into the peripheral devices and convert information furnished in a native format to the format of the computer. Each such arrangement is adapted to handle a particular format conversion. Consequently, when a piece of peripheral equipment operating in a particular format is to be used with a particular computer system utilizing a different format, circuitry must be provided for converting between the formats before the equipment can be utilized. Often the design of such conversion circuitry is so expensive that the two pieces of equipment are never used together.

Even when circuitry is provided for format conversion as a part of a peripheral device, the total cost of the computer system rises because of the specialized nature of the converting circuitry. It is much more cost effective if the same converting circuitry can be used with all peripheral devices so that its design and manufacturing costs are spread over a much larger base.

SUMMARY OF THE INVENTION

It is, therefore, an object of the present invention to provide interface circuitry which allows a computer to utilize a large plurality of the information formats likely to be encountered in equipment used with the computer.

It is another object of the present invention to reduce the overall cost of computer systems It is another more specific object of the present invention to provide a polymorphic interface for transferring information between computer components.

These and other objects of the present invention are realized in an interface circuit for translating data in one of a plurality of data formats into data in any of a plurality of other data formats comprising means for storing data appearing in a first format in groups each equal to the number of bytes of data in a second format, means for selecting unused bytes from a first one of the groups stored by the means for storing data and from a second one of the groups stored by the means for storing data, means for placing the unused bytes selected in numerical byte order, and means for placing the data in the numerical byte order in byte position for transfer to the format of a destination device.

These and other objects and features of the invention will be better understood by reference to the detailed description which follows taken together with the drawings in which like elements are referred to by like designations throughout the several views.

BRIEF DESCRIPTION OF THE DRAWINGS

FIG. 2 is a diagram illustrating a number of different formats with which it is desirable to interface various computer components.

NOTATION AND NOMENCLATURE

Some portions of the detailed descriptions which follow are presented in terms of representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. In all cases, the distinction between the method operations in operating a computer and the method of computation itself should be borne in mind. The present invention relates to apparatus for operating a computer in processing electrical or other (e.g. mechanical, chemical) physical signals to generate other desired physical signals.

DETAILED DESCRIPTION OF THE INVENTION

Figure 1:
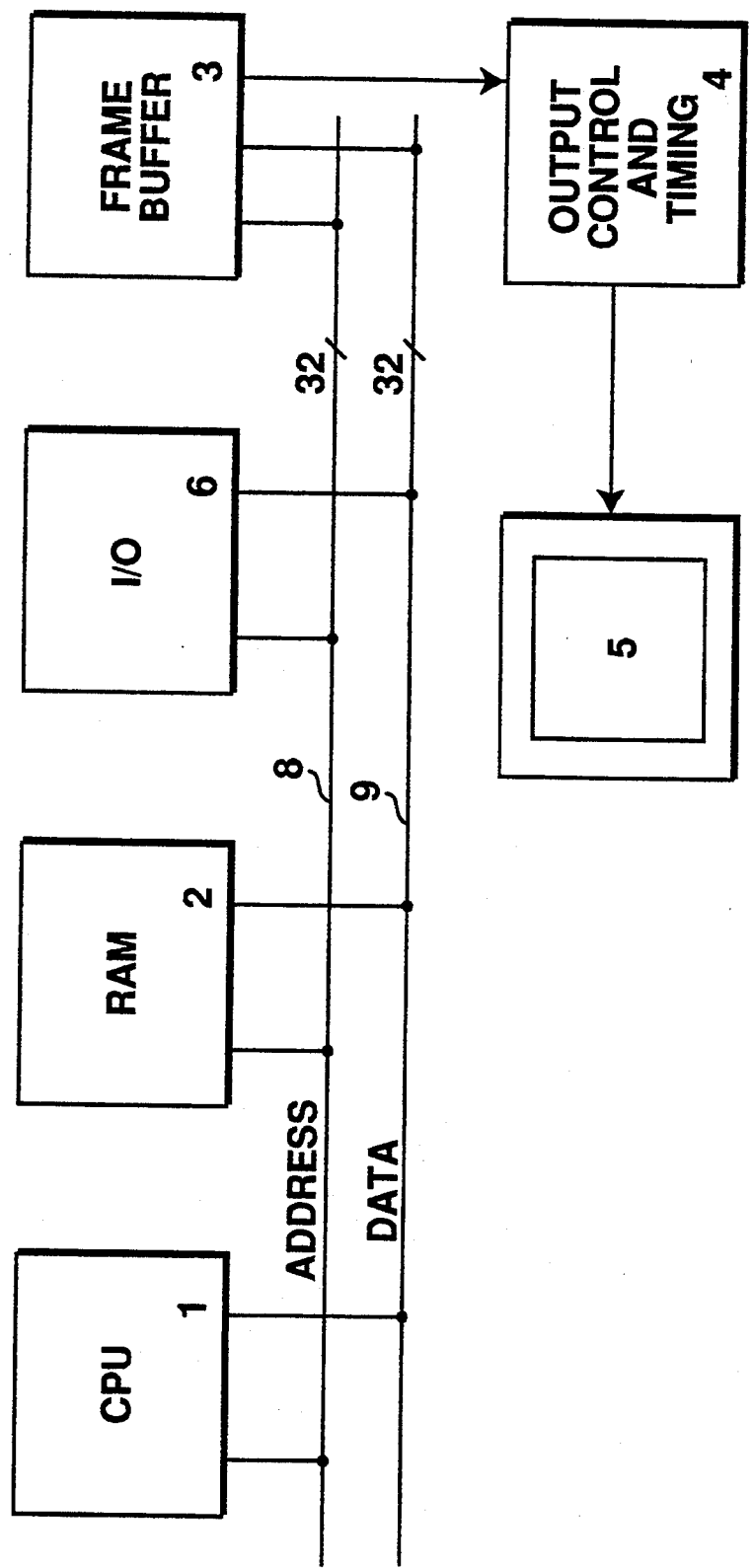
FIG. 1 is a block diagram illustrating a typical computer system.

Referring now to FIG. 1, there is illustrated a block diagram which sets forth in general detail the components of a typical computer system. The system includes a central processing unit 1, random access memory 2, a frame buffer memory 3, output control and timing circuitry 4, an output display 5, and input/output circuitry 6. In general, each of the main components such as the central processing unit 1, the random access memory 2, the frame buffer memory 3, and the input/output circuitry 6 are joined together by connection to a system bus. A typical system bus may include an address bus 8 and a data bus 9. Each of the address bus 8 and the data bus 9 includes a plurality of conductors each connecting to all of the components on the bus in parallel. A common system bus today uses thirty-two individual lines for each of the data and address lines to connect individual components of the system.

A component such as the central processing unit 1 directs data to another component by placing the address to which the data is directed on the system address bus 8 and the data on the system data bus 9. An address may be represented by thirty-two bits of binary coded information all of which are represented by two state signals placed on the conductors of the address bus 8. In like manner, the data on the data bus 9 is represented by binary coded two state signals placed on the conductors of the data bus 9. Both the address and the data typically take all of the conductors of the address and data buses other than those used for control signals. Circuitry associated with the component which is the destination for the data recognizes an address on the address bus 8 within its range of addresses and, if free to receive data, accepts the data available on the data bus 9.

Certain of the components joined to the bus may operate with information presented in different formats. For example, the central processing unit 1 may utilize data in one format while the input/output unit 6 may present the information from external circuitry in an entirely different format. For any component to be able to understand information transferred to it, that information must be placed in the format that component understands.

For example, referring now to FIG. 2, there are illustrated five different formats in which information may be used in computers. These formats are some of those more typically used in personal computers. Illustrated along the top of the figure are sixty-four bit positions (numbered from 0 at the right to 63 at the left) in which data bits may appear. These bit positions are divided into eight different bytes. In each of the formats, bit positions 32 to 63 are utilized for thirty-two bits of address information as is illustrated in the bottom row of the figure.

Names for the five formats are indicated to the left side of the figure. Beginning at the top row, the first format illustrated is called sixty-four bit multiplexed (64 Mxd). In this format, the thirty-two bits of address appear during a first clock cycle in bit positions 32-63; on the next clock cycle, sixty-four bits of data are carried in bit positions 0-63. The second format from the top is called thirty-two bit separate format (32 Sep). In this format, the address again appears in bit positions 32-63; and the data appears in bit positions 0-31 during the same clock cycle. The third format from the top is called the sixteen bit separate format (16 Sep). In this format, the address appears in bit positions 32-63; and the data appears in bit positions 0-15 during the same clock cycle. The fourth format from the top is called the eight bit separate format (8 Sep). In this format, the address appears in bit positions 32-63; and the data appears in bit positions 0-7 during the same clock cycle. The final format is called the thirty-two bit multiplexed format (32 Mxd). In this format, the address appears in bit positions 32-63 during the first clock cycle followed on the next clock cycle by the thirty-two bits of data in the same bit positions 32-63. In each of these formats, the thirty-two bits of address appear in the same bit positions.

The data is shown in FIG. 2 by a series of numbers which indicate for each format which byte of data is in a particular byte position. Thus, in the sixty-four bit multiplexed format, the data comprises eight bytes labelled 0-7. The highest order byte, byte 0, falls in bit positions 56-63 while the lowest order byte, byte 7, falls in bit positions 0-7 in this format.

It will be recognized by those skilled in the art that the particular bit positions for the formats illustrated are those utilized by computer components which deal with information in the so-called "big endian" formats in which the largest valued portion of a number appears first. Devices of this sort are manufactured, for example, by Motorola Corporation. This format structure is used for illustration purposes only. Of course, the invention could as well be used in systems which handle data in "little endian" formats by varying the bit positions.

The circuitry of the present invention provides the format which a particular component connected to the interface requires in response to an indication by the component of its requirements. Presuming that one particular component associated with the interface provides information in one of the formats, for example, the circuitry of this invention will convert the information into any of the other formats depending on the requirements of the component receiving the information. In the preferred embodiment of the invention, the interface is utilized to connect a number of devices including a central processing unit to an interconnect such as a system bus. Since such an interconnect (or any single component) will typically operate in a single format, the information being furnished to the interconnect is always converted into the single format which is used by the interconnect. The data so converted may then be used without restriction by the interconnect (or other component).

Figure 5:
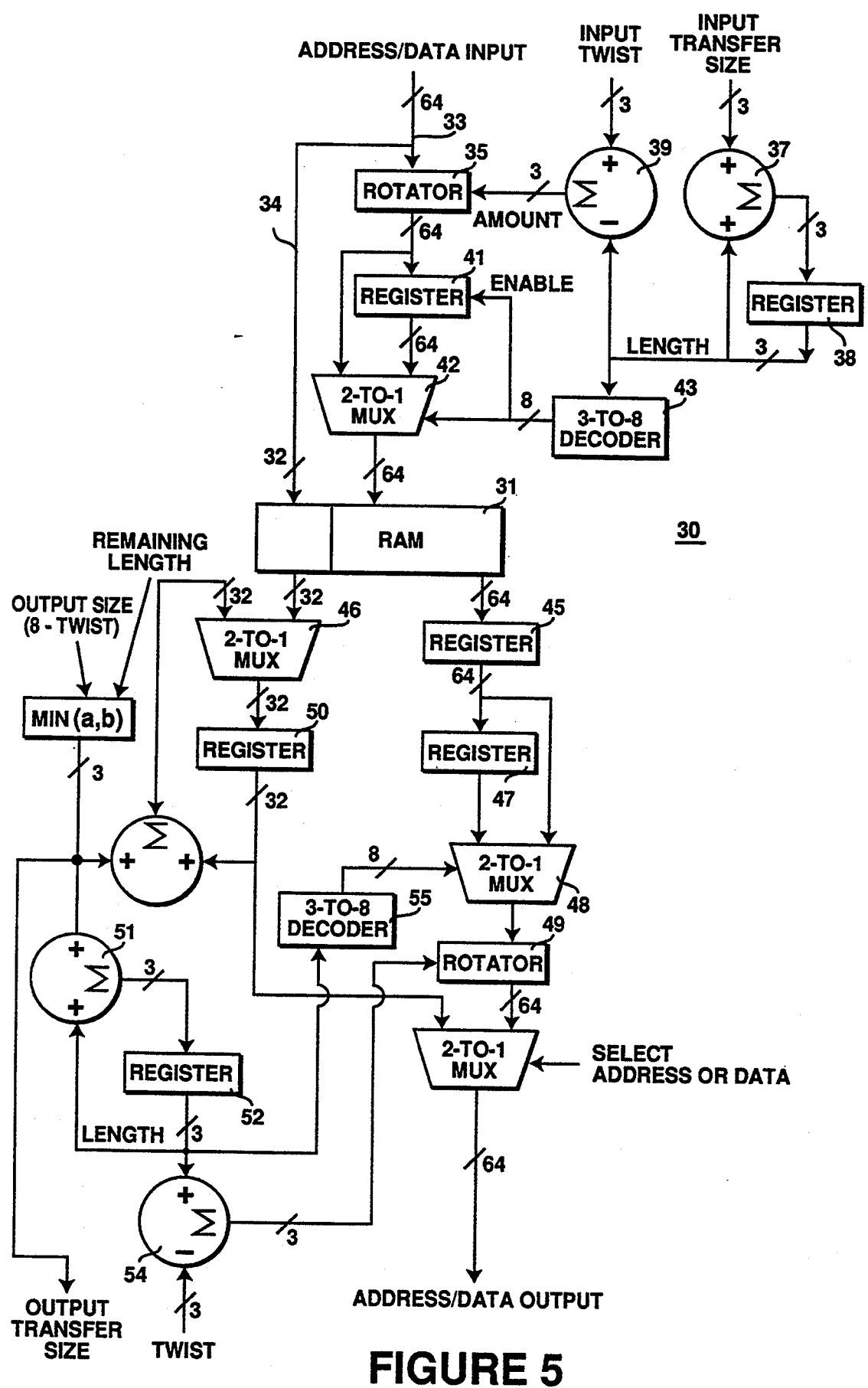
FIG. 5 is a block diagram illustrating in detail a polymorphic interface constructed in accordance with the invention.

If the receiving component (the interconnect) is, in fact, part of a complete system all of the components of which use the same format, then once the data is within the system, all components expect to see this format. If it is desired to send the data to a device outside the system or any component in the system which utilizes a different format, then a format conversion from the internal format to the format desired by the device may be caused to occur using essentially identical interface circuitry. In fact, in the preferred embodiment, the interface circuitry may be duplicated in each direction from the central interconnect to allow the ready conversion between any of a number of formats and an internal format. An arrangement including such two way conversion circuitry is illustrated in FIG. 5 and described in detail hereinafter.

Figure 3:
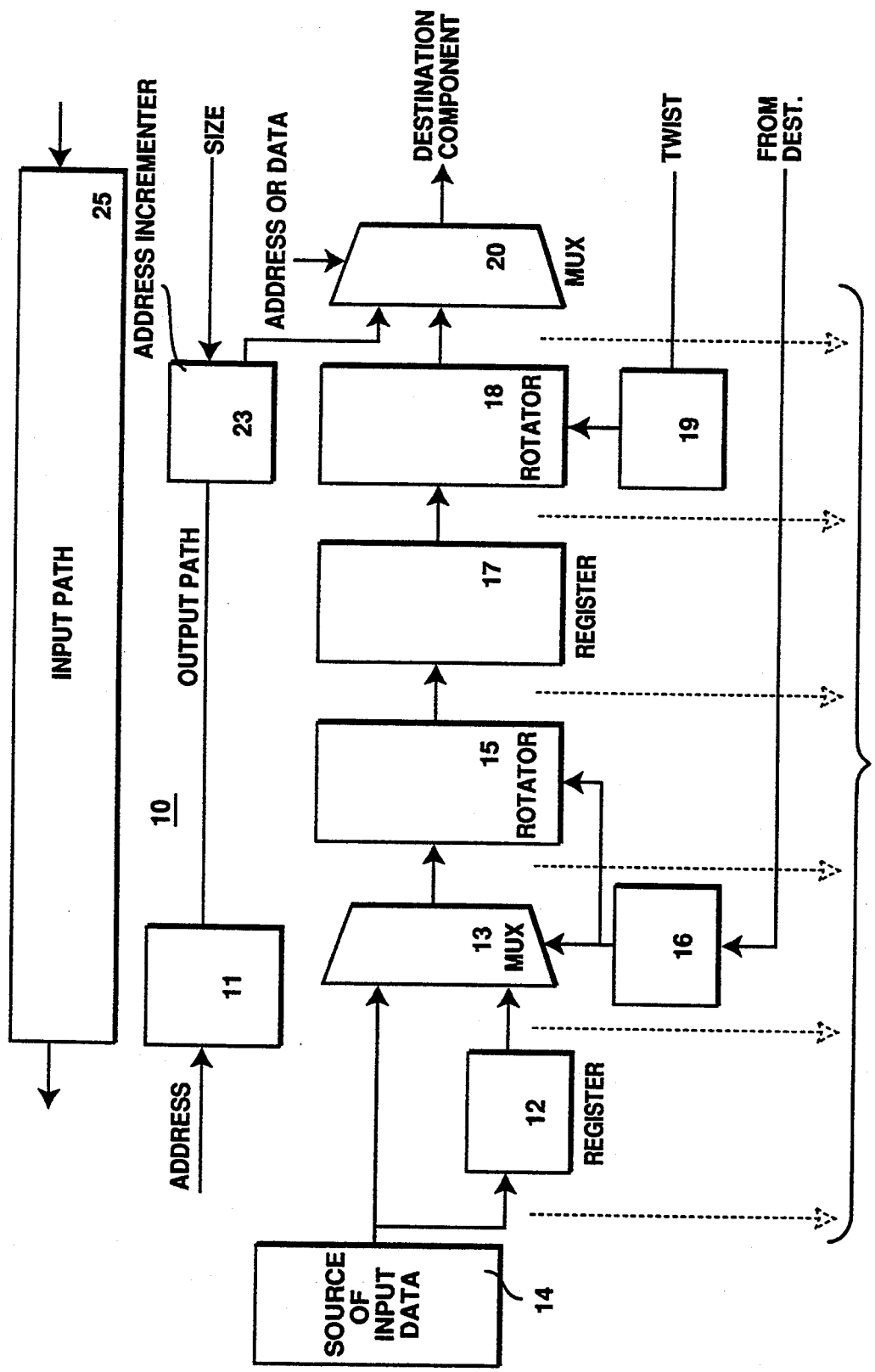
FIG. 3 is a block diagram illustrating a polymorphic interface constructed in accordance with the invention.

FIG. 3 illustrates a circuit 10 constructed in accordance with the invention for providing a polymorphic interface between components. The circuit 10 includes a first register 12. The register 12 may in a preferred embodiment accept sixty-four bits (eight bytes) of valid (as yet unused) data at its input; in any case, the register 12 must be large enough to accept the number of bytes present in the largest format to be handled by the interface. The register 12 of the preferred embodiment thus stores sixty-four bits or eight bytes of information. A second register 11 receives the thirty-two bits of address information for the entire eight bytes which are to be transferred.

Information is furnished to the register 12 from a source of data 14. For the purpose of this explanation, it will be presumed that the source of data 14 presents eight bytes of data at a time. The source of data 14 may be considered to be the interconnect to which other components are connected in the preferred embodiment described above. A multiplexor 13 is connected to the register 12 and to the source of data 14 to selectively transfer the data therefrom. The multiplexor 13 is capable of selecting in byte increments for transfer one or more individual bytes from the eight bytes (sixty-four bits) of information presented to it for transfer. The multiplexor 13 may accept information from either the register 12 or from the source of data 14.

The multiplexor 13 allows the selective transfer of bytes of data furnished by the source 14 and those held in the register 12 so that eight bytes of valid data are available at all times. For example, if data is being translated two bytes at a time and two bytes of the data held in the register 12 have already been translated by the interface during a previous transfer of data, then the two "used" bytes held in the register 12 are replaced during the transfer by the first two bytes of data from the next eight bytes of data furnished by the source 14 when the multiplexor 13 transfers data during the next clock interval. Consequently, a total of eight bytes of valid data is always available for transfer by the multiplexor 13.

The multiplexor 13 transfers eight bytes of valid data to a rotator circuit 15. This information may, however, be in a distorted byte order. For example, if some portion of the data less than eight bytes has already been transferred to the other side of the interface, then that information will have been replaced by the multiplexor 13 with later valid information from the register 14. In such a case, the byte order of the valid eight bytes will be out of the sequence which the receiving circuitry expects. The rotator circuit 15 reorients the entire eight bytes of information to place it in the correct byte order. It does this by utilizing information from the destination component which tells how much information (in bytes) has been consumed of the total of eight bytes available at each cycle. This value is determined by a counter circuit 16 from the number of bytes transferred in each pass through the interface in the particular format translation and the number of passes which have occurred. This information is termed "length" information in the description of the much more detailed circuit of FIG. 5. The rotator circuit 15 rotates the information furnished by the multiplexor 13 by the number of bytes consumed to place the next valid bytes to be transferred in byte lanes zero and one for a next register 17. In the preferred embodiment, the rotator 15 may be a barrel shifter (an array of multiplexing circuits well known to the prior art) which rotates the sixty-four bits of data in byte increments. The register 17 is placed in the circuit for pipelining purposes only and performs no logical operation on the data.

From the register 17, the data is transferred to a second rotator 18 which utilizes information at a control circuit 19 from the destination component to determine in which byte lane the information is to appear for the format used by the destination component. For example, if the destination component is operating in sixteen bit separate format, FIG. 2 illustrates that byte zero is to appear in byte lane 1 (the second byte lane in the format). It will be recognized that byte zero is furnished by the source 14 in byte lane 7 while byte seven is furnished in byte lane 0. For a translation to the sixteen bit separate format, therefore, the rotator 18 using the twist information rotates the data so that byte zero appears at that position in byte lane 1 automatically.

The information provided by the destination component to the circuit 19 to determine the number of bytes by which the bytes of information are to be rotated by the rotator 18 is called twist. The manner in which this information is utilized to control the translation and the apparatus by which it is accomplished are described in detail with reference to the circuit of FIG. 5. The logic circuitry utilized to provide the twist value is selected in the preferred embodiment of the invention to be combinatorial logic. Combinatorial logic operates so that when the twist value changes, the signal output by the twist logic circuitry changes without regard to the system clock. Consequently, it may be used for both slow and fast transfers. If the byte lane address to which the data being translated is utilized to determine a value which is fed back as the twist value, then the data will be automatically transferred to the correct byte lane position during the same cycle of operation. The address consistency (the address always appears in the same 32 bit positions) provided by the invention and the use of combinatorial logic in the twist circuitry allow byte aligned transfers of data of any format size to be made to a simple peripheral component which has no circuitry dedicated to the problem. The interface provides size information to the destination on each transfer to indicate how many bytes are valid. This information has a maximum value of eight minus the value of the twist since the preferred embodiment does not support bus wrapping.

As with the rotator 15, the rotator 18 may be a barrel shifter which rotates the sixty-four bits of data in byte increments. The data provided by the rotator 18 is transferred by a multiplexor 20 along with the address information from the register 11 to the destination component where it appears in the format prescribed by the destination component.

Figure 4:
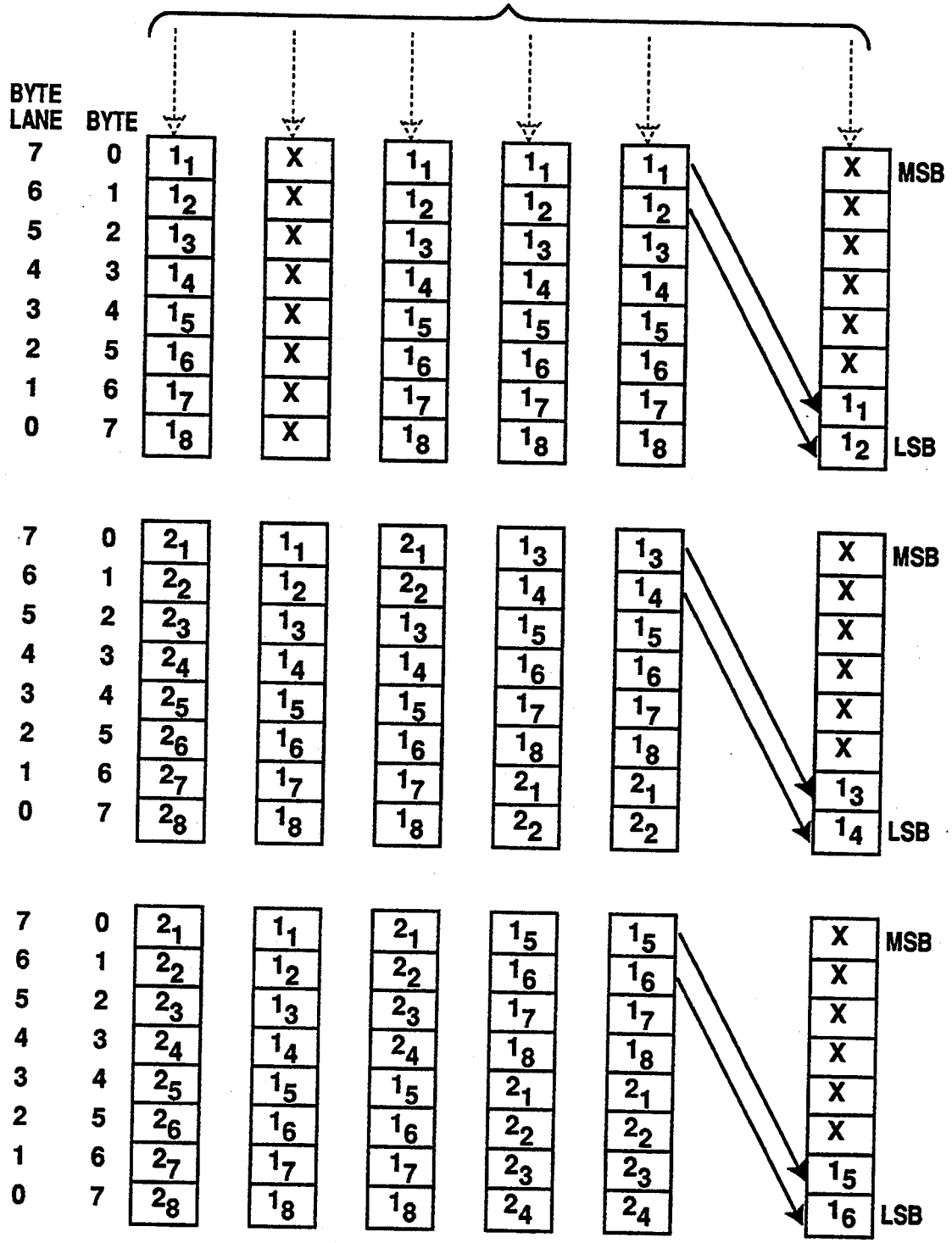
FIG. 4 presents a series of views of data held at particular positions of the circuit of FIG. 3.

FIG. 4 presents a series of views of the bytes of data furnished at the outputs of particular defined elements of the circuit 10 of FIG. 3 which may be used to assist in understanding the operation of the circuit 10. The upper row of byte patterns illustrates a first transfer operation through the circuit 10, the second row of byte patterns illustrates a second operation, and the lower row of byte patterns illustrates a third operation. Beginning at the left of the figure, a first eight bytes are presented on the input lines from the source 14 to the register 12 and the multiplexor 13. Since these bytes are all valid (that is none have yet been transferred across the interface to the destination component), the multiplexor 13 transfers all of the bytes of the first eight bytes of input information from the source 14 to the rotator 15. These same eight bytes are also stored in the register 12. An indication that the bytes are valid comes from the destination component which indicates to the circuit 16 that no bytes have yet been transferred by sending back a length value of zero. Moreover, since none of the bytes of the first eight have yet been transferred to the destination component, they are in the correct byte order for the destination component as they are transferred by the multiplexor 13 and are, therefore, transferred without rotation by the rotator 15 to the register 17. As may be seen from the number one placed in each byte of the byte patterns in FIG. 4, each of the bytes furnished by the source 14, each of the bytes transferred by the multiplexor 13, and each of the bytes furnished by the rotator 15 are from the first eight bytes of data.

Presuming, for example, that the format into which the data is being transferred is the sixteen bit separate format, then only the first two bytes of information in the incoming sixty-four bit word are to be used. As FIG. 2 illustrates, the two bytes presented by the source 14 in byte lanes 6 and 7 in the sixty-four bit multiplexed format should appear in byte lanes 1 and 0 at the destination component when translated into sixteen bit separate format. The twist information at the control circuit 19 designating the position to which the information is to be transferred for the destination component is used to control the rotator 18 to accomplish this rotation of the data. The data from the rotator 18 is then transferred by the multiplexor 20 across the interface to the destination component (not shown) in appropriate byte order and in the correct byte lanes for use in the desired output format. The address of the data is transferred from the register 11 to indicate its destination in the prescribed time sequence for the sixteen bit separate format used by the destination component.

On the next translation cycle, the register 12 still holds the data from the first eight bytes of input information. However, the first two bytes of this data have already been transferred across the interface 10. This is indicated to the multiplexor 13 by the counter 16 which records the size of the transfer and the number of transfers. Responding to this count, the multiplexor 13 transfers eight bytes of information to the rotator 15 as illustrated with the two bytes in the byte lanes 0 and 1 being from the second eight bytes of input data from the source 14 (this is indicated in the diagrams of FIG. 4 by the number two in the byte position).

It will be recognized by those skilled in the art that the data sent to the rotator 15 by the multiplexor 13 is now out of its proper byte-serial order with the bytes from the first packet of eight bytes appearing after the bytes from the second packet of eight bytes. The rotator 15 is controlled by the counter 16 which summarizes the length transferred using the information from the destination component describing the output format and the number of transfers to rotate the eight bytes of input data so that the register 17 receives those bytes in correct byte order with the bytes from the second eight bytes transferred to the low numbered byte lanes.

It should be noted that as illustrated in FIG. 2, the address bits for any data in any format are always presented in the same thirty-two bit positions. This consistency of address position allows the apparatus of the present invention to function with packetized information without having to be concerned about the differences in byte addresses for individual transfers in the different formats. For example, if an address and a packet of eight bytes of data are presented at the interface by the source 14, and it is desired to utilize the data in the packet two bytes at a time in the sixteen bit separate format, the addresses for the conversion will be automatically provided from the initial address without the aid of the circuitry presenting or receiving the information. This is accomplished by a circuit 23 which increments the address presented for the first byte of the eight bytes of data by the size of the data transfer being accomplished in the format translation. Thus, if two bytes of data are transferred as in the sixteen bit separate format, the address for the next two bytes is automatically incremented by two bytes so that it is correct for these next two bytes. For the 32 bit separate format, a transfer is incremented by four bytes; while with the eight bit separate format, each transfer is increment by a single byte. This facility allows the interface of this invention to function with peripheral components of the simplest sort.

Once the eight bytes have been rotated to the correct byte serial order by the rotator 15 and placed in the register 17, they are furnished to the rotator 18. The circuit 19 controls the rotator 18 using the twist value signified by the destination component to place the bytes of data which are next in serial order in byte lanes zero and one where the destination component expects data to appear in the sixteen bit separate format. This causes a shift of the data by six byte lanes, the difference in the byte lanes at which the zero and one bytes appear in the sixteen bit separate and the sixty-four bit multiplexed formats as illustrated in FIG. 2. It should be noted that if the destination component expected the data to appear in some other byte lane because of the idiosyncrasy of the destination component, this twist value would be furnished to assure the correct translation of the data to the correct byte lane. This is better described with respect to FIG. 5.

These bytes of data are then transferred by the multiplexor 20 to the destination component along with the address bits in the appropriate time sequence for the format used by the destination component. It should be noted that the size of the packet of data being sent from the source at each clock is transferred to a destination component along with the data itself. The source size value is important when the per clock transfer size to the destination does not divide evenly into the source size because the last transfer in a packet will have less than the expected number of bytes.

On the third translation cycle, the register 12 still holds the data from the first eight bytes of input information. However, the first four bytes of this data have already been transferred across the interface 10. This is indicated to the multiplexor 13 by the counter 16 which records the size of the transfer and the number of transfers. Responding to this count, the multiplexor 13 transfers eight bytes of information to the rotator 15 as illustrated with the four bytes in the byte lanes 0 through 3 being from the second eight bytes of input data from the source 14 (this is indicated in the diagrams of FIG. 4 by the number two in the byte position).

It will be recognized by those skilled in the art that the data sent to the rotator 15 by the multiplexor 13 is again out of its proper byte-serial order with the bytes from the first packet of eight bytes appearing after the bytes from the second packet of eight bytes. The rotator 15 is controlled by the counter 16 which summarizes the length transferred using the information from the destination component describing the output format and the number of transfers to rotate the eight bytes of input data by four bytes so that the register 17 receives those bytes in correct byte order with the bytes from the second eight bytes transferred to the low numbered byte lanes 0 through 3.

Once the eight bytes have been rotated to the correct byte serial order by the rotator 15 and placed in the register 17, they are furnished to the rotator 18. The circuit 19 controls the rotator 18 using the twist value of six signified by the destination component to place the bytes of data which are next in serial order in byte lanes zero and one where the destination component expects data to appear in the sixteen bit separate format. This causes a shift of the data by six byte lanes.

These bytes of data are then transferred by the multiplexor 20 to the destination component along with the address bits.

Thus, the information appearing at the destination input terminals has been translated to an appropriate position for use by the destination component no matter what the format may be in which that output component operates.

As detailed above, the circuitry illustrated and discussed for accomplishing the conversion from one format to another may be duplicated with the components reversed to provide conversion from the destination component to the source component. This is illustrated in FIG. 3 by a second conversion channel 25 which includes essentially identical components arranged in reverse order to allow conversion from the destination component format to the source component format. Moreover, as discussed above, in the preferred embodiment, the source 14 is an interconnect which may be connected by a number of similar interfaces 10 to a plurality of different components used by the computer system. It such an arrangement, data in a format used at a particular component may be translated by an interface 10 to the format used by the interconnect and then retranslated by another interface 10 to another format used by another component joined to the interconnect. When the translation is done from a source such as the interconnect, the source must supply the source transfer size (previously supplied to it when the source was a destination). The size has a maximum value of eight minus twist and allows packets to have a length that is not an even multiple of the destination transfer size.

Referring now to FIG. 5, there is shown a block diagram of a polymorphic interface 30 which is a more specific arrangement for translating information from a first format for storage in a central buffer such as a random access memory 31 and for translation from the central storage or random access memory 31 to some other format for output. In the arrangement, information is presented on sixty-four input lines at input terminal 33. The information presented may be either address or data depending on the particular format and depending on the point of transfer in that format. The address information is forwarded on thirty-two lines 34 for storage in the random access memory 31. Data, on the other hand, is furnished on the sixty-four input lines to a rotator 35.

The rotator 35 of FIG. 5 serves the purpose of the two rotators 15 and 18 illustrated in FIG. 4 and accomplishes the purpose of both. To this end, a size value is furnished to an adder circuit 37 and added to any information already in a register 38 and stored in the register 38. The size value is an indication of the number of bytes being furnished at one time by the source component. If, for example, the information is appearing in the thirty-two bit separate format, then four bytes are being furnished at the one time; and the size would normally be four. In the sixteen bit separate format, on the other hand, the size would be two since only two bytes of data are furnished at once. It should be noted that the size may be furnished by a source component which is writing information to the random access memory 31 for transfer to some destination component or it may be supplied by a destination component which is providing information being read by a source component. In any case, the size is furnished to the adder 37 and stored in the register 38.

The value in the register 38 is then available to be added to the next size value furnished with the next information available at the data input 33. Thus, the register 38 stores a length value equivalent to the number of bytes in a particular word already presented by the source of the data. For example, if information is being furnished in the sixteen bit separate format, the amount stored in the length register when a first two bytes is being presented will be zero. To this value will be added a size amount of two bytes to place a value of two in the register 38. With the next two bytes of data furnished on the input lines 33, the size value will be added to the register length value to give a length of four. This will continue with each two bytes of input data until a full sixty-four bit or eight byte word has been accumulated. At this point, the register 38 is restored to zero and counts the length of the next group of information until eight bytes have been received. This may be accomplished by causing the register 38 to store the values of the size furnished along with the length already stored in a modulo 8 format so that once eight bytes have been received, the register 38 reverts to zero.

A second adder 39 receives a twist value from the source of the data. This twist value and the length value stored in the register 38 combine to control the amount by which the rotator 35 shifts the information appearing on the data lines in order to provide the bytes in the appropriate positions for storage in the random access memory 31. In the particular embodiment illustrated in FIG. 5, it is desired that packets of information, sixty-four bits wide of up to sixty-four bytes total be stored. Consequently, the storage in the random access memory 31 is accomplished in a packetized sixty-four bit multiplexed format illustrated in the first line of FIG. 2. Presuming that the information at input line 33 appears, for example, in the sixteen bit separate format, the 0 and 1 bytes appear in byte lanes 1 and 0. To fit into the sixty-four bit multiplexed format, these first two bytes must be shifted or twisted by six bytes to byte lanes 6 and 7 in order to appropriately fit the random access memory 31 in the sixty-four bit multiplexed format. This six byte twist is the twist value furnished to the adder 39.

At the same time, the length value indicating the number of bytes already transferred is subtracted from the twist in order to assure that the information later appearing on the input data line 33 is shifted by the correct amount. That is, if no information has yet appeared in the particular word so that the length zero is stored in the register 38, and the twist value is six, in order to translate from the sixteen bit separate format to the sixty-four bit multiplexed format, then, the zero length is subtracted from the twist value; and the rotator 35 rotates the two input bytes by the correct six bytes to place the information on the correct data lines. If, on the other hand, two bytes have already been received so that the length register 38 stores a value of two, the next two bytes of input information will receive the twist value of six from which will be subtracted the length of two already transferred, so that the ultimate amount of rotation furnished by the rotator 35 will be four bytes. Thus these second two bytes will be transferred to byte lanes 4 and 5.

The information in the rotator 35 is furnished to a register 41 and directly to a multiplexor 42. The output of the register 41 is furnished to the multiplexor 42 so that the multiplexor 42 may select from either the register 41 or the rotator 35 for furnishing data for storage in the random access memory 31.

Figure 6A:
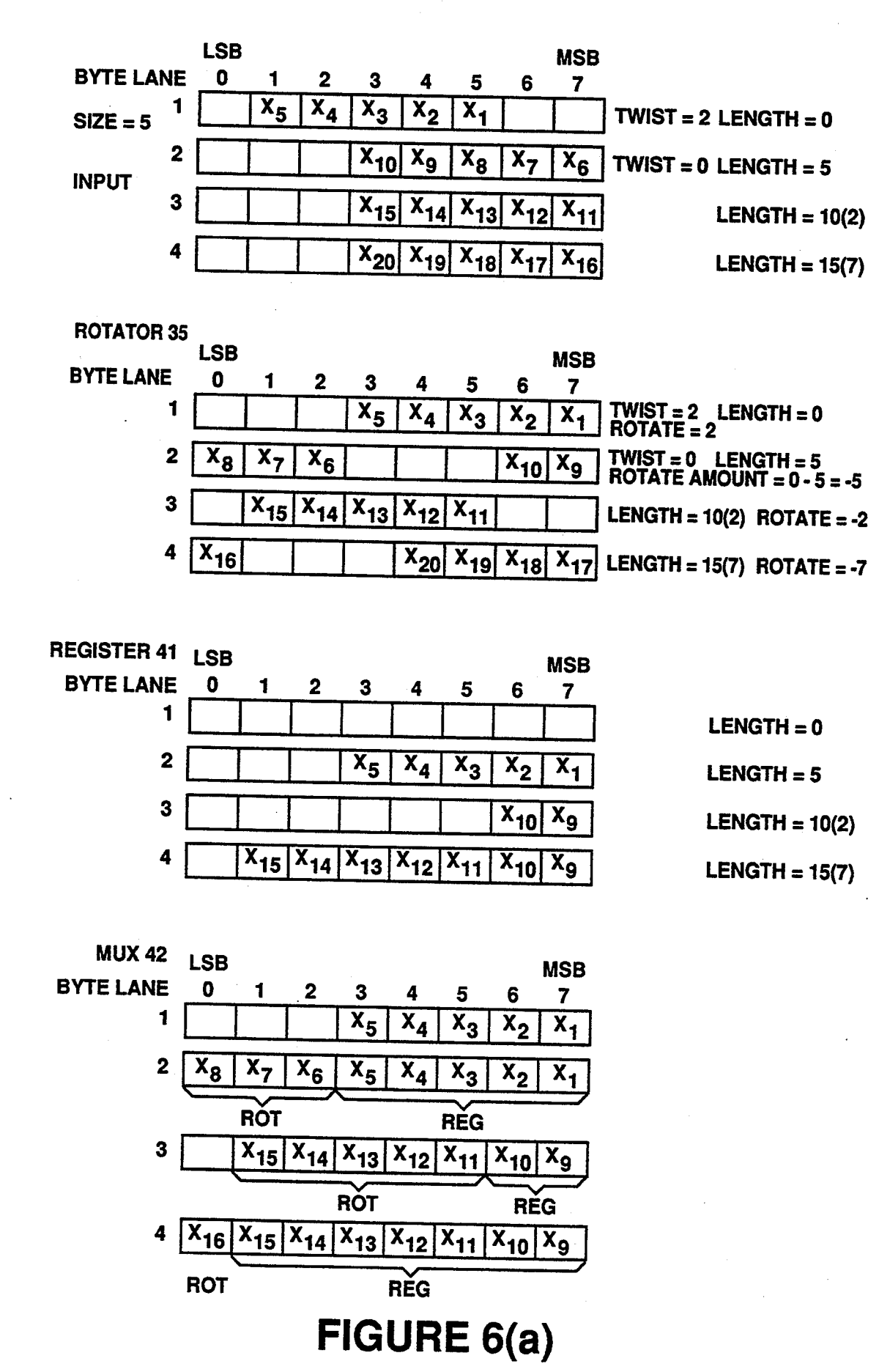

In order to illustrate the operation of the input to the random access memory 31 of the arrangement 30 illustrated in FIG. 5, a series of data inputs are illustrated in FIG. 6(a) along with the data at each of the stages of the input portion of the circuitry. In the particular operation illustrated, a size of five bytes of information is furnished at each data input. The size of five bytes has been chosen in order to illustrate the generic nature of the polymorphic interface 30 illustrated in FIG. 5. Whereas the formats described previously in FIG. 2 are more standard formats utilized in computer systems known to the prior art, the interface of this invention is capable of dealing with formats of apparently arbitrary size appearing at arbitrary byte lanes on the input path. The input information is furnished in four individual increments of five bytes of data, the first of which provides valid data in byte lanes one through five while the second, third, and fourth of which furnish valid data in byte lanes three through seven. Such a presentation of data may occur when it is necessary to select data from particular input sources for transfer to a single buffer such as the random access memory 31. The fact that the first increment of data appears in byte lanes one through five means that the information in that increment of data has a twist of two since it must be rotated to the right by two byte lanes in order to appear in the correct byte lane in the random access memory 31. On the other hand, the increments of data available in the second, third, and fourth inputs on lines 33 have a twist of zero since the most significant byte of the data appears in the correct byte lane seven. The size of each valid packet of data, of course, is five since five valid bytes appear.

When the first increment of data appears, a size of five is furnished to the adder 37 to indicate that the input information is five bytes in length. This size value is provided to the register 38. The register 38, however, holds a value of zero as the length of information which has already been furnished. This length is furnished by the register 38 to the adder 39 where it is combined with the twist value of two to control the rotator 35. Consequently, the rotator 35 takes the first increment of data and moves the five bytes to the right by two bytes so that they appear at the rotator 35 in byte lanes three through seven to the right in the eight byte spaces. At this point, the register 41 holds no valid data whatsoever, and the length value furnished to a decoder 43 is zero. Essentially, the decoder 43 provides an enable signal to the register 41 so that the value at the input of the register 41 from the rotator 35 may be transferred to the output of the register 41. The value in the decoder 43 also controls the selection by the multiplexor 42. The length value furnished to the decoder 43 of zero indicates that no valid bits are provided by the register 41, so all of the bits on the sixty-four lines at the output of the rotator 35 are furnished by the multiplexor 42 for storage in the random access memory 31.

When the next or second increment of information appears at the data input lines 33, the twist value of zero is applied to the adder 39 while the size value of five is furnished to the adder 37. The length value of five residing in the register 38 is subtracted from the twist value of zero and furnished to the rotator 35. The rotator 35 responds to the negative five provided by the adder 39 by rotating the data on the input lines left by five bytes as is shown in the second position for rotator 35 in FIG. 6(a). This causes the highest order byte of the second increment of data to appear in byte lane two, while the lowest order byte appears in byte lane six.

This information is furnished at the input to the register 41 and to the multiplexor 42. The length of five furnished by the register 38 enables the register 41 so that the five bytes from the first word in the register 41 appear at the output. At the same time, the decoder 43 provides this length value of five to the multiplexor 42 so that the five bytes from the register 41 are indicated to be valid and are selected. At the same time, the three bytes appearing in byte lanes zero, one, and two at the output of the rotator 35 are furnished by the multiplexor 42 to the random access memory 31 so that a complete word is stored in a first sixty-four bit word position of the random access memory 31.

Once the initial length value of five has controlled the enabling of the register 41 and the selection by the multiplexor 42 during the second cycle of data transfer, the length value in the register 38 is incremented to add the size amount from the second increment of data at the data input lines to the length value to give a length value of ten. Since the register 38 stores information in modulo 8 format, the actual length stored indicates that two bytes of valid information have been transferred. This occurs since ten bytes have actually been counted but a full eight byte word has been stored and only two bytes of the first two data increments remain to be transferred from the input into the random access memory 31.

When the third increment of input data appears with a twist of zero and a size of five, the length of two stored in the register 38 is subtracted from the twist to give a value of minus two. This value causes the rotator 35 to shift the incoming data by two byte lanes to the left as is shown in cycle three for the rotator 35 in FIG. 6(a). The value previously furnished by the rotator 35 is now held in the register 41. This length value of two is transferred to the decoder 43 indicating that two bytes in byte lanes six and seven of the register 41 are valid and are to be transferred. This same length information is transferred by the decoder 43 to the selection terminal of the multiplexor 42 so that two valid bytes are selected from byte lanes six and seven of the register 41 and the remaining six bytes are selected from lanes one through five of the rotator 35.

After the length of ten (or two using modulo 8 arithmetic) has been handled by the input circuitry, the value in the register 38 is increased by five to indicate that seven valid bytes have been transferred to the register 41. When the fourth increment of data appears on the data input lines 33, with a twist of zero and size of five, the length stored in the register 38 indicates that seven bytes are valid; consequently, the new input data is moved by seven byte lanes to the left by the rotator 35 so that the most significant byte of this new data resides in byte lane zero. The decoder 43 indicates that seven valid bytes now appear at the output of the register 41 and causes the multiplexor 42 to select these seven valid bytes from the register 41 and the one byte from the rotator 35. These values are transferred to the random access memory 31 as the second full sixty-four bit (eight byte) word for storage therein. The inputting of information may continue in similar manner if it is desirable to shift in increments of five bytes. It is felt, however, that the explanation need not continue further for two full words of data have been moved into the random access memory 31 and all of its functions have been thoroughly explained.

When the random access memory 31 is functioning as a source of data, the output includes a register 45, a multiplexor 46, a register 47, a multiplexor 48, and a rotator 49. The output section also includes an adder 51, a length register 52, an adder 54, and a decoder 55. The circuitry of the output section of the interface 30 may be analogized to the circuitry described in FIG. 3 in that the registers 12 and 14 of FIG. 3 were presumed to be packed with sixty-four bits of valid data just as the random access memory 31 is presumed to be packed with a number of words each of which includes sixty-four bits of valid data. Because these sixty-four bits fill the entire eight byte lanes, no input twist value is involved.

In operation, the size of the information to be transferred to the destination component at each step of the data movement is furnished to the adder 51 by selecting the smallest of either a value equal to eight (byte lanes available) minus any output twist value or remaining packet length (total length minus value in register 52). This length value is determined through accumulation in the register 52 using an adder 51 in the same manner as with the adder 37 and the register 38; thus, the length value is initially zero when no transfer has yet occurred. The length value is furnished to the decoder 55 for controlling the selection by the multiplexor 48 from the two registers 45 and 47. The output twist value is also furnished to the adder 54 and subtracted from the length held in the register 52 to control the rotation of the data by the rotator 49.

Figure 6B:
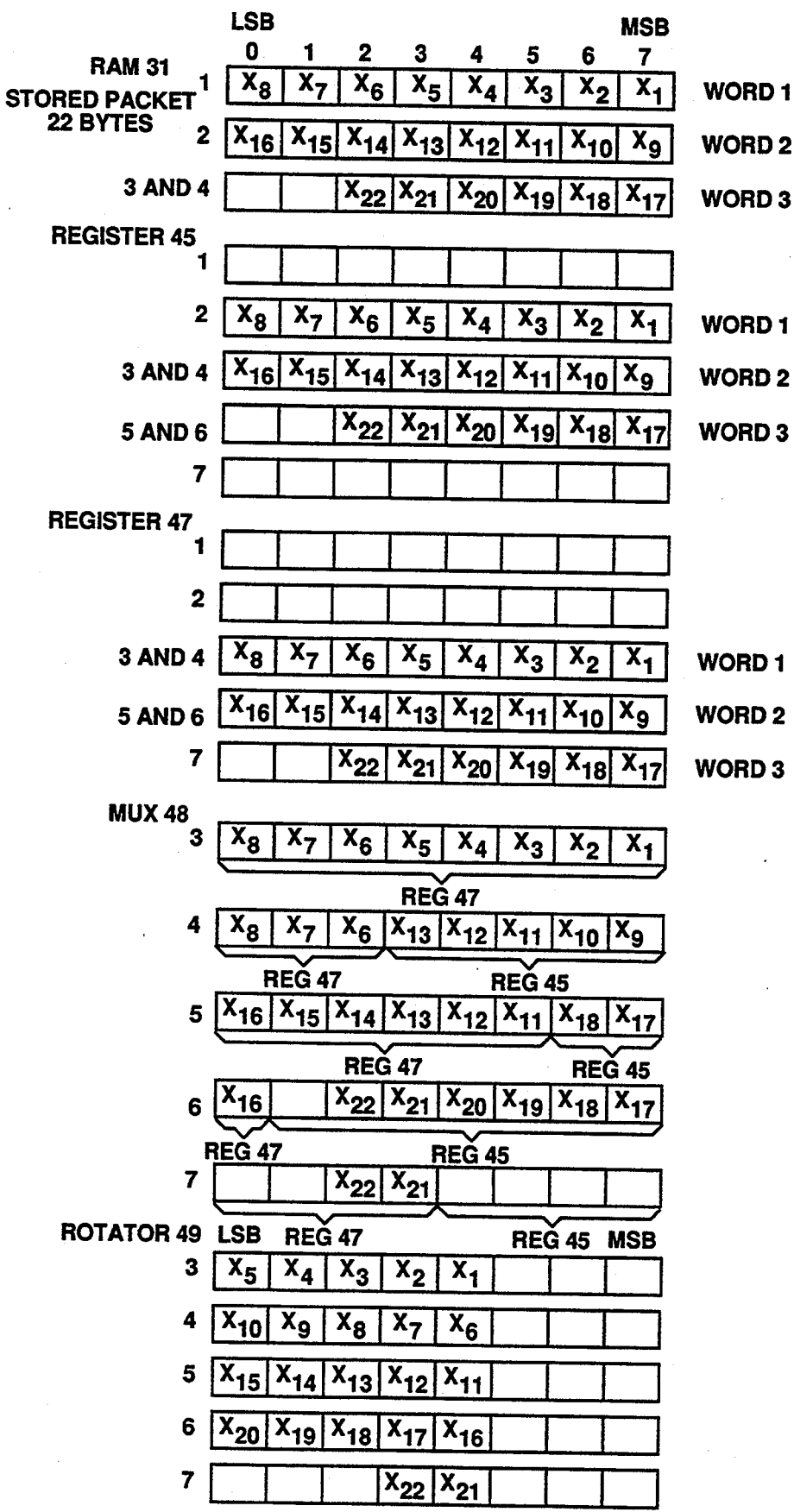
FIG. 6(a) and (b) presents a series of views of data held at particular positions of the interface of FIG. 5.

FIG. 6(b) illustrates an operation in which twenty-two bytes of data stored in two packed eight byte words and six additional bytes are transmitted to a destination component. As may be seen in the first three lines of FIG. 6(b) which illustrate cycles at the output of the RAM 31, these bytes of data are furnished in first and second complete words and a third incomplete word which includes six bytes. At the cycle labelled one in FIG. 6(b) when the first eight byte word is made available at the output of the random access memory 31, neither the register 45 nor the register 47 contains any valid data. The multiplexor 46 is utilized to transfer address information and to increment the address furnished to match the output size and twist. On the first transfer cycle, the address transfer is accomplished by providing an enable pulse to the multiplexor 46 causing the selection of thirty-two bits of address information. The address information in the random access memory 31 is then transferred directly by the multiplexor 46 to the register 50 and then through the multiplexor 56 to the destination device. After the first transfer cycle, the address held in the register 50 is added to a value which is the smaller of the output size or the remaining length of the particular packet being transferred in order to automatically provide the correct address for the increments of data transferred during transfer cycles of less than eight bytes. This new address is transferred by the multiplexor 46 to the destination device for each particular increment of data.

On the first transfer cycle, the first word of data is transferred to the register 45. When the second word of data appears at the output of the RAM 31, the first word of data held in the register 45 is transferred by the multiplexor 46 to the register 47, and the second data word is placed into the register 45. When the first word of data reaches the register 47, the transfer of the data by the multiplexor 48 is controlled by the decoder 55. The decoder 55 receives the value stored in the length register 52 to control the transfer. At this point, the register 52 stores a length of zero since no data has been transferred to the destination. That length of zero in register 52 causes the decoder 55 to enable the multiplexor 48 to select the eight valid bytes from the register 47 for transfer to the rotator 49.

As with the rotator 35 described above, the rotator 49 accomplishes the operations of both the rotators 15 and 18 of FIG. 3. This is accomplished by controlling the rotation using a value obtained by the adder 54 through subtracting the value of any output twist from the length value stored in the register 52. This generates a rotation value which assesses both the value of the length already transferred and the twist. Presuming that data increments in sizes of five bytes are to be transferred during each output cycle to byte lanes one and four of the destination component (this size of five bytes and the odd output byte lane alignment are again used to demonstrate the ability of the arrangement 30 to transfer odd formats), the twist value would be three. This would cause the rotator 49 to rotate the data transferred by the multiplexor 48 left to the byte lanes zero through four as illustrated in cycle 3 for the rotator 49 in FIG. 6(b). This data is then transferred to the destination component on the correct byte lanes with the most significant byte of the data appearing in byte lane four.

At this point, the value in the register 52 (which stores the length of the amount transferred) is incremented by the transfer size of five. The transfer size is furnished to the adder 51 and is furnished to the destination component so that it may determine how much of the data remains to be transferred. The transfer size is obtained by taking the maximum possible transfer size of eight, subtracting the twist value to give the usual transfer value, and then selecting either the least of that transfer value obtained or the remaining length to be transferred of the particular group of words. Since only the first five bytes have been transferred at this point, the value of that first transfer is furnished to the adder 51 and stored in the register 52. The value of five in the register 52 is furnished to the decoder 55 and causes the multiplexor 48 to select the three bytes from register 47 which were not used in the last transfer cycle along with five bytes of the second data word held in the register 45. Since the register 45 stores the second word to be transferred during each of the third and fourth cycles and the register 47 stores the first word to be transferred during each of the third and fourth cycles, the multiplexor 48 transfers the remainder of the first word and the first five bytes of the second word during this second transfer. The output twist value of three is combined with the length value of five by the adder 54, and a value of two is furnished to control the rotator 49 to rotate the data transferred by the multiplexor 48 right by two bytes so that the most significant valid byte is placed in byte lane four. In this manner, five bytes are transferred to the output beginning with the three bytes remaining in register 47 which were unused in the first transfer and continuing through the first two bytes of word two held in the register 45.

At this point, the size value of five is added to the length value of five held in the length register 52 to give a total value of ten which, being greater than eight by two, is stored as the value two in the modulo 8 length register 52. Since the entire first word in the RAM 31 has been transferred to the output, during the fifth cycle, the register 45 receives and stores a third word from the random access memory 31 while the second word is transferred from the register 45 to the register 47. The length value of two in the register 52 indicates that two bytes of the second word have already been transferred to the output. This value causes the decoder 55 to actuate the multiplexor 48 to select the six bytes remaining in word two held in register 47 and two bytes from word 3 held in the register 45. These byte values are transferred by the multiplexor 48 to the rotator 49. The rotator 49 receives from the adder 54 the difference between the length value of two and the twist value of three (minus one) and rotates the data transferred by the multiplexor 48 one byte to the left. This aligns the most significant five bytes in byte lanes zero through four for transfer to the output. It will be noted that at this point all but the last byte of word two has been transferred to the destination component.

At this point, the length value is again incremented by the size from the value two to the value seven. Since neither word two held in register 47 nor word three held in register 45 has yet been completely transferred, those values are retained in the registers 47 and 45 during cycle six. The length value held in register 52 is transferred to the decoder 55 and causes the multiplexor 48 to select the one remaining valid byte from the register 47 and seven bytes from the register 45. These bytes are transferred by the multiplexor 48 to the rotator 49. The adder 54 combines the length value of seven with the twist value of three to provide a value of four. The rotator 49 thus rotates the data furnished by the multiplexor 48 to provide an output shifted right by four byte lanes to byte lanes zero through four.

Again the transfer size of five from the previous transfer is added by the adder 51 to the value in the register 52 to provide a total of twenty bytes having been transferred (which when stored in modulo 8 format is the length of four). This length of four indicates that the total of six bytes in the third word four have been transferred so that only two remain. Since word two has been completely transferred to the output, in cycle seven, word three is transferred to the register 47. The length value four held in the register 52 causes the decoder 55 to operate the multiplexor 48 to select the last two bytes of word three held in register 47 and the first four bytes from the register 45 which contains no valid data. The adder 54 transfers a value of one (four length minus three twist) to cause the rotator 49 to rotate the data transferred by the multiplexor 48 right by one byte lane. This causes the last two valid bytes to be transferred in byte lanes three and four to the destination component.

At this point, the size value is transferred into the adder 51 to increment the value in the length register 52. The size value transferred in this case is equivalent to the remaining value in the packet in bytes at the last transfer (or two). This value is realized by the use of the comparator which selects size to be equal to the remaining value of the packet where it is less than the standard size value (which in this case is five). Consequently, the register 52 holds the value six showing that all of the valid bytes is the registers 45 and 47 have been transferred and the transfer is complete. Since the transfer size is also supplied to the device by the interface, the device is made aware that only two bytes of the last transfer are valid.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A circuit for translating data in one of a plurality of data formats into data in any of the other of the plurality of the data formats comprising a first storage device storing data from a first number of input bytes of data, a first selector coupled to said first storage device and selecting unused bytes from the first number of data bytes stored by the first storage device and from a second number of input bytes of data, a first rotator coupled to said first selector and placing the unused bytes selected in numerical byte order, according to the number of transfers already made, a second rotator coupled to said first rotator and placing the data in the numerical byte order in an arbitrary byte position for transfer to the format of a destination device, and a counter coupled to said first selector and determining the number of bytes utilized in the format to which the data is to be translated and the number of transfers already made.

2. A circuit for translating data in one of a plurality of data formats into data in any of the other of the plurality of the data formats as claimed in claim 1 in which the first storage device comprises a first register having a number of bit positions equal to the number of bits in the largest format to be converted and capable of storing bits in sequential order as they are received.

3. A circuit for translating data in one of a plurality of data formats into data in any of the other of the plurality of the data formats as claimed in claim 1 in which the first selector comprises a register having a number of bit positions equal to the number of bits in the largest format to be converted and capable of storing bits in sequential order as they are received, and a multiplexor for selecting data from the register and following sequential bits of data.

4. A circuit for translating data in one of a plurality of data formats into data in any of the other of the plurality of the data formats as claimed in claim 1 in which the first rotator comprises a plurality of multiplexing circuits arranged as a barrel rotator.

5. A circuit for translating data in one of a plurality of data formats into data in any of the other of the plurality of the data formats as claimed in claim 1 in which the second rotator comprises a plurality of multiplexing circuits arranged as a barrel rotator responsive to an indication of the output format to rotate the data into the byte lane in which the data should appear.

6. A circuit for translating data in one of a plurality of data formats into data in any of the other of the plurality of the data formats as claimed in claim 1 in which the first storage device comprises a first register having a number of bit positions equal to the number of bits in the largest format to be converted and capable of storing bits in sequential order as they are received; and the first selector comprises a second register having a number of bit positions equal to the number of bits in the largest format to be converted and capable of storing bits in sequential order as they are received, and a multiplexor for selecting data from the first and the second registers.

7. A circuit for translating data in one of a plurality of data formats into data in any of the other of the plurality of the data formats as claimed in claim 1 further comprising a second storage device coupled to said second rotator for storing data from a first number of input bytes of data appearing in the format of a destination device, a second selector coupled to said second storage device for selecting unused bytes from the first number of data bytes stored by the second storage device and from a second number of input bytes of data in the format of the destination device, a third rotator coupled to said second selector for placing the unused bytes selected by the second selector in numerical byte order, and a fourth rotator coupled to said third rotator for placing the data in the numerical byte order in byte position for transfer to the format of the input device whereby the format of data may be translated to and from two individual formats of data.

8. A circuit for translating data in one of a plurality of data formats into data in any of the other of the plurality of the data formats as claimed in claim 1 in which the first storage device comprises a first register having a number of bit positions equal to the number of bits in the largest format to be converted and capable of storing bits in sequential order as they are received; and the first selector comprises a second register having a number of bit positions equal to the number of bits in the largest format to be converted and capable of storing bits in sequential order as they are received, and a multiplexor for selecting data from the first and the second registers.

9. A circuit for translating data in one of a plurality of data formats into data in any of the other of the plurality of the data formats as claimed in claim 8 further comprising a second storage device coupled to said second rotator for storing data from a first number of input bytes of data appearing in the format of a destination device, a second selector coupled to said second storage device for selecting unused bytes from the first number of data bytes stored by the second storage device and from a second number of input bytes of data in the format of the destination device, a third rotator coupled to said second selector for placing the unused bytes selected by the second selector in numerical byte order, a fourth rotator coupled to said third rotator for placing the data in the numerical byte order in byte position for transfer to the format of the input device whereby the format of data may be translated to and from two individual formats of data.

10. A circuit for translating data in one of a plurality of data formats into data in any of the other of the plurality of the data formats as claimed in claim 1 in which the first storage device comprises a first register having a number of bit positions equal to the number of bits in the largest format to be converted and capable of storing bits in sequential order as they are received; and the first selector comprises a second register having a number of bit positions equal to the number of bits in the largest format to be converted and capable of storing bits in sequential order as they are received, and a multiplexor for selecting data from the first and the second registers.

11. A circuit for translating data in one of a plurality of data formats into data in any of the other of the plurality of the data formats as claimed in claim 10 further comprising a second storage device coupled to said second rotator for storing data from a first number of input bytes of data appearing in the format of a destination device, a second selector coupled to said second storage device for selecting unused bytes from the first number of data bytes stored by the second storage device and from a second number of input bytes of data in the format of the destination device, a third rotator coupled to said second selector for placing the unused bytes selected by the second selector in numerical byte order, and a fourth rotator coupled to said third rotator for placing the data in the numerical byte order in byte position for transfer to the format of the input device whereby the format of data may be translated to and from two individual formats of data.

12. A circuit for translating data in one of a plurality of data formats into data in any of the other of the plurality of the data formats as claimed in claim 1 in which the first storage device comprises a first register having a number of bit positions equal to the number of bits in the largest format to be converted and capable of storing bits in sequential order as they are received; and the first selector comprises a second register having a number of bit positions equal to the number of bits in the largest format to be converted and capable of storing bits in sequential order as they are received, and a multiplexor for selecting data from the first and the second registers.

13. A circuit for translating data in one of a plurality of data formats into data in any of the other of the plurality of the data formats as claimed in claim 12 further comprising a second storage device coupled to said second rotator for storing data from a first number of input bytes of data appearing in the format of a destination device, a second selector coupled to said second storage device for selecting unused bytes from the first number of data bytes stored by the second storage device and from a second number of input bytes of data in the format of the destination device, a thirst rotator coupled to said second selector for placing the unused bytes selected by the second selector in numerical byte order, and a fourth rotator coupled to said third rotator for placing the data in the numerical byte order in byte position for transfer to the format of the input device whereby the format of data may be translated to and from two individual formats of data.

14. A circuit for translating data in one of a plurality of data formats into data in any of the other of the plurality of the data formats as claimed in claim 1 in which the counter comprises combinatorial logic circuitry.

15. A circuit for translating data in one of a plurality of data formats into data in any of the other of the plurality of the data formats as claimed in claim 14 in which an address for data to be translated is transferred to the counter.

16. A circuit for translating data in one of a plurality of data formats into data in any of the other of the plurality of the data formats comprising a first channel including a storage device for storing data appearing in a first format in groups each equal to the number of bytes of data in a second format, a selector coupled to said storage device and selecting unused bytes from a first one of the groups stored by the storage device and from a second one of the groups stored by the storage device, a first rotator coupled to said selector and placing the unused bytes selected in numerical byte order according to the number of transfers already made, a second rotator coupled to said first rotator and placing the data in the numerical byte order in an arbitrary byte position for transfer to the format of a destination device, and a counter coupled to said selector and determining the number of bytes utilized in the format to which the data is to be translated and the number of transfers already made.

17. A circuit for translating data in one of a plurality of data formats into data in any of the other of the plurality of the data formats as claimed in claim 16 further comprising a second channel for translating data in one of a plurality of data formats into data in any of the other of the plurality of the data formats.

18. A method for translating data in one of a plurality of data formats into data in any of the other of the plurality of the data formats comprising:
   storing data from a first number of input bytes of data in a storage device;
   selecting unused bytes from the first number of data bytes stored by the storage device and from a second number of input bytes of data;
   determining the number of bytes consumed;
   placing the unused bytes selected in numerical byte order according to said number of bytes consumed;
   determining a starting byte position of a format of a destination device wherein said starting byte position is at an arbitrary location; and
   placing the data in the numerical byte order in said starting byte position for transfer to the format of said destination device.

19. A method for translating data in one of a plurality of data formats into data in any of the other of the plurality of the data formats comprising a first channel including:
   storing data appearing in a first format in groups each equal to the number of bytes of data in a second format;
   selecting unused bytes from a first one of the groups stored and from a second one of the groups stored;
   determining the number of bytes consumed;
   placing the unused bytes selected in numerical byte order according to said number of bytes consumed;
   determining a starting byte position of a format of a destination device wherein said starting byte position is at an arbitrary location; and
   placing the data in the numerical byte order in said starting byte position for transfer to the format of said destination device.

20. A translation circuit for translating data in one of a plurality of data formats into data in any of the other of the plurality of data formats comprising:
   a first register which stores data from a first number of input bytes of data, said first register being coupled to an input of said translation circuit for translating data;
   a first multiplexer coupled to said first register, said first multiplexer selecting unused bytes from the first number of data bytes stored by the first storage device and from a second number of input bytes of data;
   a first rotator coupled to said first multiplexer, said first rotator placing the unused bytes selected in numerical byte order;
   a counter coupled to said first multiplexer and to said first rotator, said counter counting the number of transfers from an output of said translation circuit and controlling said first multiplexer to thereby select said unused bytes;
   a second register coupled to said first rotator to receive data from an output of said first rotator and to store said data from said output of said first rotator;
   a second rotator coupled to second register, said second rotator placing the data in the numerical byte order in an arbitrary byte position for transfer to a destination device, said second rotator coupled to said output of said translation circuit.

21. A translation circuit as in claim 20 wherein said first register has a number of bit positions equal to the number of bits in the largest format to be converted and is capable of storing bits in sequential order as they are received, and wherein said first rotater comprises a plurality of multiplexing circuits arranged as a first barrel rotator, and wherein said second rotator comprises a plurality of multiplexing circuits arranged as a second barrel rotator that is responsive to and on indication of the output format to rotate data into the byte lane in which the data should appear.

* * * * *